United States Patent
Wang (10) Patent No.: US 12,302,156 B2
(45) Date of Patent: May 13, 2025

(54) METHOD FOR PROCESSING CSI FOR NON-SERVING CELL, ELECTRONIC DEVICE, AND MEDIUM

(71) Applicant: BEIJING UNISOC COMMUNICATIONS TECHNOLOGY CO., LTD., Beijing (CN)

(72) Inventor: Hualei Wang, Beijing (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 351 days.

(21) Appl. No.: 17/793,929

(22) PCT Filed: Feb. 5, 2021

(86) PCT No.: PCT/CN2021/075645
§ 371 (c)(1),
(2) Date: Jul. 26, 2022

(87) PCT Pub. No.: WO2021/148047
PCT Pub. Date: Jul. 29, 2021

(65) Prior Publication Data
US 2023/0060256 A1    Mar. 2, 2023

(30) Foreign Application Priority Data
Jan. 20, 2020   (CN) .......................... 202010067510.6

(51) Int. Cl.
*H04W 24/10*   (2009.01)
*H04B 7/06*    (2006.01)
*H04L 1/00*    (2006.01)

(52) U.S. Cl.
CPC .......... *H04W 24/10* (2013.01); *H04B 7/0626* (2013.01); *H04L 1/0023* (2013.01)

(58) Field of Classification Search
None
See application file for complete search history.

(56) References Cited

U.S. PATENT DOCUMENTS

2013/0051322 A1* 2/2013 Barbieri ................ H04W 72/21
                                                                                370/328
2016/0286419 A1* 9/2016 Liu ........................ H04L 43/16
(Continued)

FOREIGN PATENT DOCUMENTS

| CN | 108933648 A | 12/2018 |
| CN | 109417416 A | 3/2019 |
| CN | 109478971 A | 3/2019 |
| CN | 110249574 A | 9/2019 |

(Continued)

OTHER PUBLICATIONS

Ericsson; "Analysis of Intra-frequency and Inter-frequency Measurement Definitions", 3GPP TSG RAN WG4 Meeting #84; R4-1708384, Aug. 20, 2017, 5 Pages.

Qualcomm Incorporated: "Intra-frequency and Inter-frequency Definition for NR", 3GPP TSG-RAN WG4 RAN#84; R4-1707909, Aug. 20, 2017, 2 Pages.

(Continued)

*Primary Examiner* — Lonnie V Sweet
(74) *Attorney, Agent, or Firm* — HAUPTMAN HAM, LLP (57) ABSTRACT

A method for processing channel state information (CSI) for a non-serving cell is disclosed. The method includes receiving downlink control information (DCI) for triggering an aperiodic CSI report; determining whether the aperiodic CSI report is an aperiodic CSI report for the non-serving cell; and determining that a CSI computation delay requirement for the aperiodic CSI report corresponds to a predefined first CSI computation delay requirement, based on a determina- (Continued)

tion that the aperiodic CSI report belongs to the aperiodic CSI report for the non-serving cell, where the first CSI computation delay requirement is greater than or equal to a second CSI computation delay requirement corresponding to a serving cell.

17 Claims, 3 Drawing Sheets

(56) References Cited

U.S. PATENT DOCUMENTS

2017/0310384 A1* 10/2017 Park ................ H04L 1/0073
2020/0120527 A1* 4/2020 Fan ................ H04W 72/04

FOREIGN PATENT DOCUMENTS

WO 2013028887 A1 2/2013
WO 2019031879 A1 2/2019

OTHER PUBLICATIONS

Qualcomm Incorporated: "UE Power Consumption Reduction in RRM Measurements", 3GPP TSG-RAN WGi1 Meeting 1901; R1-1900913, Jan. 12, 2019, 13 Pages.
Huawei et al: "Correction on timing-related UE capability parameters for L1-RSRP reporting in TS38.214", 3GPP TSG-RAN WG1 Meeting #98bis; R1-1910424, Oct. 5, 2019, 3 Pages.
Extended European search report issued For EP application No. 21744894.3 mailed on Jan. 29, 2024, 12 Pages.
Ericsson, Clarification of time location of CSI reference resource, 3GPP TSG-RAN WG1 Meeting #99, R1-1912661, dated Nov. 18-22, 2019, 4 Pages.
Huawei et al. "Correction on timing-related UE capability parameters for L1-RSRP reporting in TS38.214" 3GPP TSG-RAN WG1 Meeting #98bis, R1-1910424, Oct. 20, 2019. 3 Pages.
WIPO, International Search Report and Written Opinion for International Application No. PCT/CN2021/075645, Apr. 27, 2021, 4 Pages.

* cited by examiner

METHOD FOR PROCESSING CSI FOR NON-SERVING CELL, ELECTRONIC DEVICE, AND MEDIUM

CROSS-REFERENCE TO RELATED APPLICATION(S)

This application is a National Stage of International Application No. PCT/CN2021/075645, field Feb. 5, 2021, which claims priority to Chinese Patent Application No. 202010067510.6, filed Jan. 20, 2020, the entire disclosures of which are hereby incorporated by reference.

TECHNICAL FIELD

This application relates to the technical field of wireless communication, and in particular to a method and system for processing channel state information (CSI) for a non-serving cell, an electronic device, and a medium.

BACKGROUND

Wireless communication networks are widely deployed to provide various communication services such as voice, video, packet data, messaging, broadcast, and the like. A wireless communication network may contain many cells that support communication for many user equipment (UE). Generally, for a UE in a connected state, a cell that establishes a communication connection or performs data communication with the UE is referred to as a serving cell, and a cell that establishes no communication connection or performs no data communication with the UE is referred to as a non-serving cell.

SUMMARY

In one aspect, a method for processing channel state information (CSI) for a non-serving cell is provided. The method is applied to a user equipment and includes: receiving downlink control information (DCI) for triggering an aperiodic CSI report; determining whether the aperiodic CSI report is an aperiodic CSI report for the non-serving cell; and determining that a CSI computation delay requirement for the aperiodic CSI report corresponds to a predefined first CSI computation delay requirement, based on a determination that the aperiodic CSI report is the aperiodic CSI report for the non-serving cell, where the first CSI computation delay requirement is greater than or equal to a second CSI computation delay requirement corresponding to a serving cell.

In another aspect, an electronic device is further provided. The electronic device includes a memory, a processor, and a computer program stored in the memory and executable on the processor to carry out the above method for processing CSI for the non-serving cell.

In another aspect, a computer-readable storage medium storing a computer program is provided. The computer program is executable on a processor to carry out the above method for processing CSI for the non-serving cell.

DETAILED DESCRIPTION

The present disclosure is further described below by means of embodiments, but the present disclosure is not limited to the scope of the described embodiments.

At present, a CSI computation delay requirement in a protocol of physical layer procedure for data (3GPP TS38.214) specification is only applied for the serving cell, but is not applicable for the non-serving cell, which cannot meet requirements on CSI measurement and reporting for non-serving cells.

In some embodiments, a method for processing channel state information (CSI) for a non-serving cell is applied to a user equipment (UE).

Figure 1:
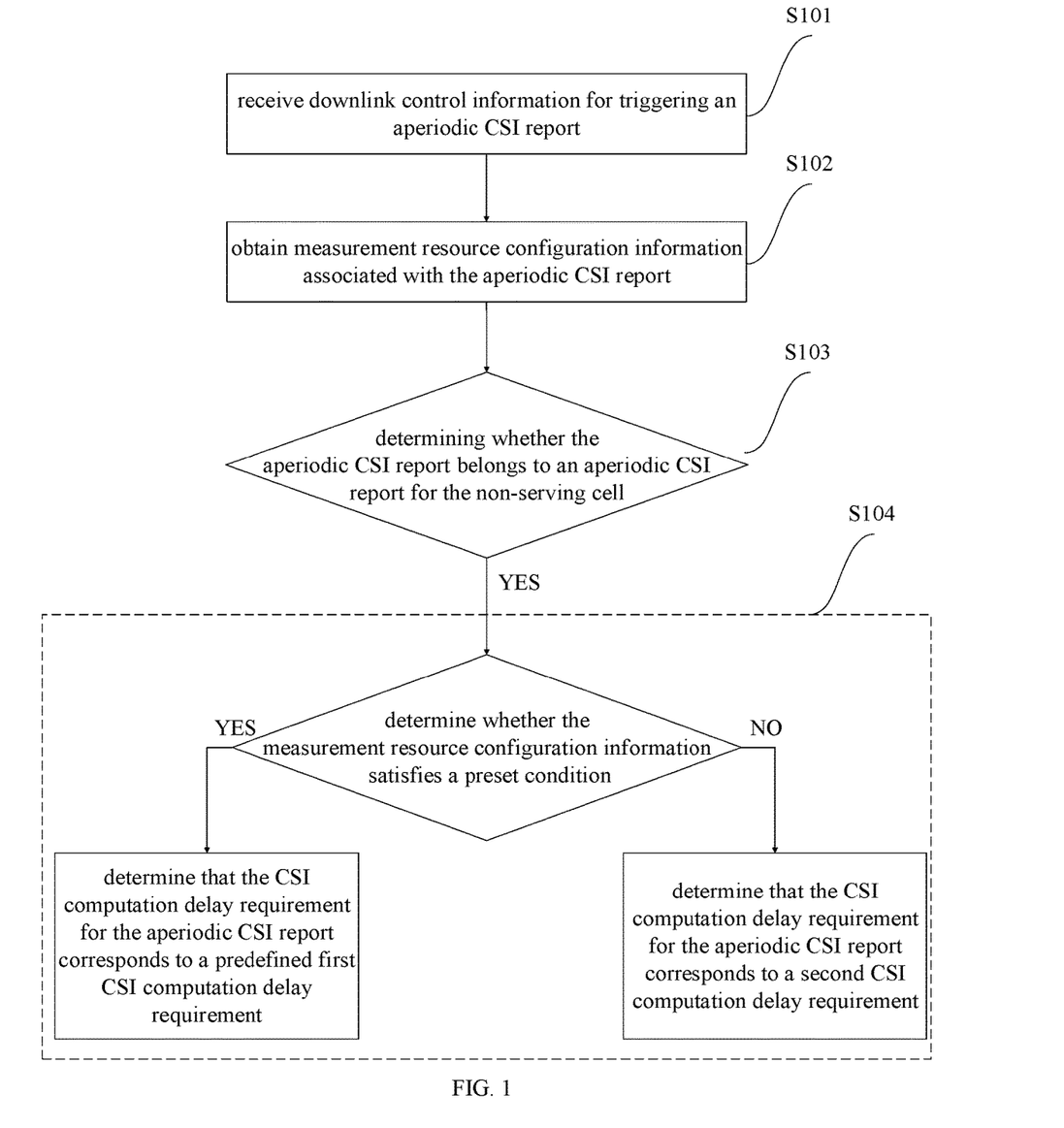
FIG. 1 is a flowchart of a method for processing CSI for a non-serving cell in some embodiments of the disclosure.

As illustrated in FIG. 1, the method for processing CSI for a non-serving cell includes the following.

S101, the UE receives downlink control information (DCI).

The DCI includes but is not limited to a CSI request field. The DCI triggers an aperiodic CSI report.

S102, the UE obtains measurement resource configuration information associated with the aperiodic CSI report.

S103, the UE determine whether the aperiodic CSI report belongs to an aperiodic CSI report for the non-serving cell. If the aperiodic CSI report is an aperiodic CSI report for the non-serving cell, proceed to S104.

Specifically, operations at S103 include obtaining, from a network configuration, a measurement signal associated with the aperiodic CSI report, where the measurement signal is information from the measurement resource configuration information, determining whether a physical cell identifier (PCI) of the measurement signal corresponds to the non-serving cell, and determining that the aperiodic CSI report belongs to the aperiodic CSI report for the non-serving cell if the PCI of the measurement signal corresponds to the non-serving cell.

Those skilled in the art should understand that whether the aperiodic CSI report is the CSI report for the non-serving cell may also be determined in other manners.

It should be noted that the measurement signal may refer to non-zero power (NZP) CSI-RS or synchronization signal and PBCH block (SSB) (SS/PBCH block set) or CSI-inference measurement (CSI-IM) used for measurement.

S104, the UE determines whether the measurement resource configuration information satisfies a preset condition. If the measurement resource configuration information satisfies the preset condition, the UE determines that the CSI computation delay requirement for the aperiodic CSI report corresponds to a predefined first CSI computation delay requirement. If the measurement resource configuration information does not satisfy the preset condition, the UE determines that the CSI computation delay requirement for the aperiodic CSI report corresponds to a second CSI computation delay requirement.

The preset condition includes at least one of: the measurement resource configuration information including measurement gap configuration information, the measurement resource configuration information including frequency point configuration information different from frequency point configuration information for the serving cell, or the measurement resource configuration information including sub-carrier-space configuration information different from sub-carrier-space configuration information for the serving cell.

It should be noted that the measurement gap configuration information is mainly used to configure time information and other related information for the terminal to interrupt all activities of the serving cell. The measurement gap configuration information may be measGapConfig, GapConfig, or the like, which are not limited in this embodiment.

The preset condition may also be adjusted according to actual requirements. The preset conditions may further include other preset conditions, which are not limited in this embodiment.

The first CSI computation delay requirement is greater than or equal to the second CSI computation delay requirement corresponding to the serving cell Specifically, the second CSI computation delay requirement may be $(Z_3, Z'_3)$, reference for which may be referred to 3GPP TS 38.214: "NR; Physical layer procedures for data". The first CSI computation delay requirement may be represented as $(Z_4, Z'_4)$ or $(Z_3+d, Z'_3+t)$, where both d and t are greater than or equal to 0.

In this embodiment, by introducing the corresponding CSI computation delay requirement $(Z_4, Z'_4)$ for the non-serving cell into the existing protocol specification, the CSI computation delay requirement of an aperiodic CSI can be defined to follow the CSI computation delay requirement for the non-serving cell, thus avoiding that the terminal does not perform aperiodic CSI measurement and reporting for the non-serving cell.

In addition, the terminal determines whether to perform aperiodic CSI measurement and/or CSI reporting for the non-serving cell according to the CSI computation delay requirement for the non-serving cell, which is similar to an existing determination manner of whether to perform aperiodic CSI measurement and/or CSI reporting for the serving cell, which therefore will not be repeated herein.

In this embodiment, the CSI computation delay requirement corresponding to the non-serving cell is predefined, and an aperiodic CSI report is triggered according to the CSI request field. If the aperiodic CSI report is for the non-serving cell and the associated measurement resource configuration information satisfies the preset condition, the CSI computation delay requirement is determined to follow the predefined CSI computation delay requirement, so that the CSI computation delay requirement for the non-serving cell can be satisfied, and subsequent CSI measurement and reporting requirements for the non-serving cell can be satisfied.

Figure 2:
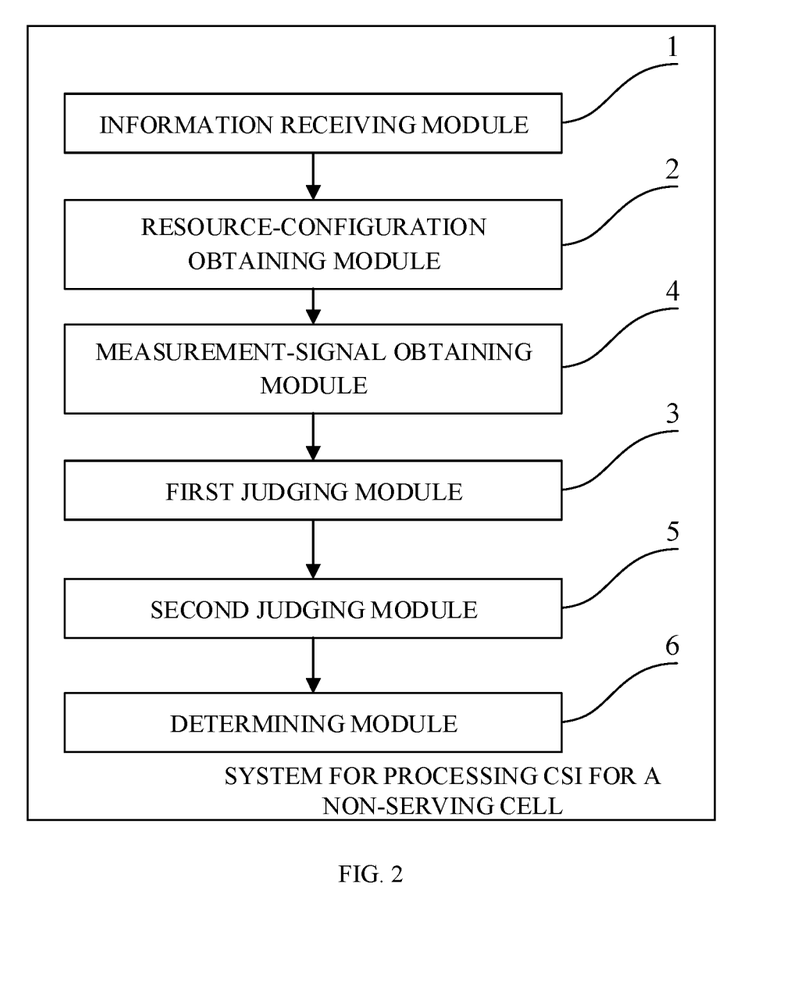
FIG. 2 is a schematic block diagram of a system for processing CSI for a non-serving cell in some embodiments of the disclosure.

As illustrated in FIG. 2, a system for processing CSI for a non-serving cell includes an information receiving module 1, a resource-configuration obtaining module 2, a first judging module 3, a measurement-signal obtaining module 4, a second judging module 5, and a determining module 6.

The information receiving module 1, the resource-configuration obtaining module 2, the first judging module 3, the measurement-signal obtaining module 4, the second judging module 5, and the determining module 6 are configured in a UE.

The information receiving module 1 is configured to receive DCI for triggering an aperiodic CSI report. The DCI includes but is not limited to a CSI request field.

The resource-configuration obtaining module 2 is configured to obtain measurement resource configuration information associated with the aperiodic CSI report.

The first judging module 3 is configured to determine whether the aperiodic CSI report belongs to an aperiodic CSI report for the non-serving cell. If the aperiodic CSI report belongs to the aperiodic CSI report for the non-serving cell, the second judging module 5 is invoked.

Specifically, the measurement-signal obtaining module 4 is configured to obtain, from a network configuration, a measurement signal associated with the aperiodic CSI report. The measurement signal is information from the measurement resource configuration information.

The first judging module 3 is configured to determine whether a PCI of the measurement signal corresponds to the non-serving cell. If the PCI of the measurement signal corresponds to the non-serving cell, the first judging module 3 determines that the aperiodic CSI report belongs to the aperiodic CSI report for the non-serving cell.

Those skilled in the art should understand that whether the aperiodic CSI report is the CSI report for the non-serving cell may also be determined in other manners.

It should be noted that the measurement signal may refer to NZP CSI-RS or SSB (SS/PBCH block set) or CSI-IM used for measurement.

The second determining module 5 is configured to determine whether the measurement resource configuration information satisfies a preset condition. If the measurement resource configuration information satisfies the preset condition, the second determining module 5 invokes the determining module 6 to determine that the CSI computation delay requirement for the aperiodic CSI report corresponds to a predefined first CSI computation delay requirement. If the measurement resource configuration information does not satisfy the preset condition, the second determining module 5 invokes the determining module 6 to determine that the CSI computation delay requirement for the aperiodic CSI report corresponds to a second CSI computation delay requirement.

The preset condition includes at least one of: the measurement resource configuration information including measurement gap configuration information, the measurement resource configuration information including frequency point configuration information different from frequency point configuration information for the serving cell, or the measurement resource configuration information including sub-carrier-space configuration information different from sub-carrier-space configuration information for the serving cell.

It should be noted that the measurement gap configuration information is mainly used to configure time information and other related information for the terminal to interrupt all activities of the serving cell. The measurement gap configuration information may be measGapConfig, GapConfig, or the like, which are not limited in this embodiment.

The preset condition may also be adjusted according to actual requirements. The preset conditions may further include other preset conditions, which are not limited in this embodiment.

The first CSI computation delay requirement is greater than or equal to the second CSI computation delay requirement corresponding to the serving cell Specifically, the second CSI computation delay requirement may be $(Z_3, Z'_3)$, reference for which may be referred to 3GPP TS 38.214: "NR; Physical layer procedures for data". The first CSI computation delay requirement may be represented as $(Z_4, Z'_4)$ or $(Z_3+d, Z'_3+t)$, where both d and t are greater than or equal to 0.

In this embodiment, by introducing the corresponding CSI computation delay requirement $(Z_4, Z'_4)$ for the non-serving cell into the existing protocol specification, the CSI computation delay requirement of an aperiodic CSI can be defined to follow the CSI computation delay requirement for the non-serving cell, thus avoiding that the terminal does not perform aperiodic CSI measurement and reporting for the non-serving cell.

In addition, the terminal determines whether to perform aperiodic CSI measurement and/or CSI reporting for the non-serving cell according to the CSI computation delay requirement for the non-serving cell, which is similar to an existing determination manner of whether to perform aperiodic CSI measurement and/or CSI reporting for the serving cell, which therefore will not be repeated herein.

In this embodiment, the CSI computation delay requirement corresponding to the non-serving cell is predefined, and an aperiodic CSI report is triggered according to the CSI request field. If the aperiodic CSI report is for the non-serving cell and the associated measurement resource configuration information satisfies the preset condition, the CSI computation delay requirement is determined to follow the predefined CSI computation delay requirement, so that the CSI computation delay requirement for the non-serving cell can be satisfied, and subsequent CSI measurement and reporting requirements for the non-serving cell can be satisfied.

Figure 3:
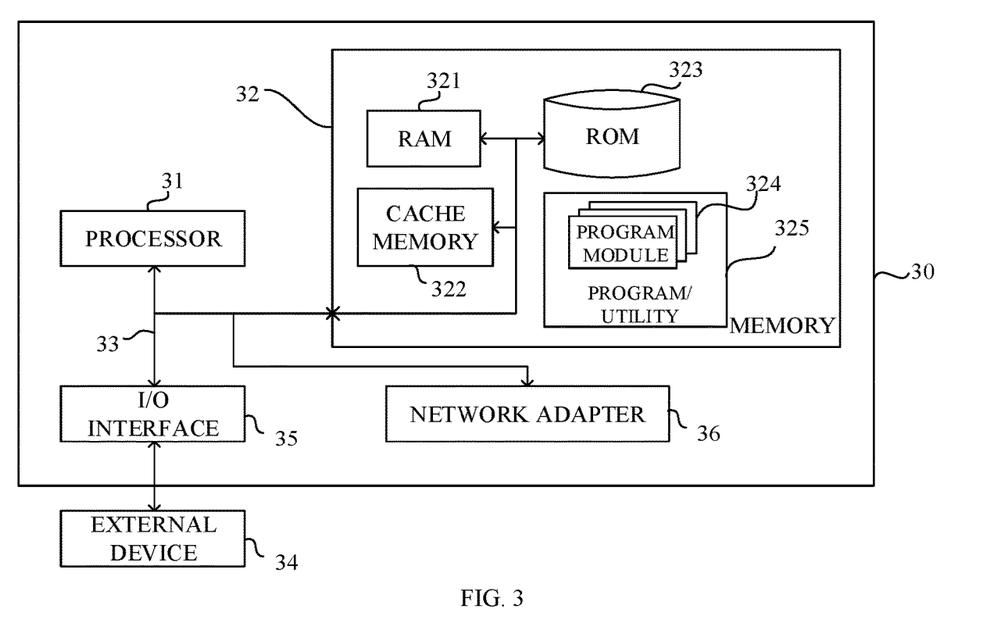
FIG. 3 is a schematic structural diagram of an electronic device for implementing a method for processing CSI for a non-serving cell in some embodiments of the disclosure.

FIG. 3 is a schematic structural diagram of an electronic device provided in some embodiments of the disclosure. The electronic device includes a memory, a processor, and a computer program stored in the memory and running on the processor. When the processor executes the program, the method for processing CSI for a non-serving cell described above is implemented. The electronic device 30 shown in FIG. 3 is only an example, and should not impose any limitation on the function and scope of use of the embodiment of the present disclosure.

As shown in FIG. 3, the electronic device 30 may take the form of a general-purpose computing device, for example, a server device. Components of the electronic device 30 may include, but are not limited to, at least one processor 31, at least one memory 32, and a bus 33 connecting different system components (including the memory 32 and the processor 31).

The bus 33 includes a data bus, an address bus, and a control bus.

The memory 32 may include volatile memory, such as random access memory (RAM) 321 and/or cache memory 322, and further include read-only memory (ROM) 323.

The memory 32 may also include a program/utility 325 having a set (at least one) of program modules 324 including, but not limited to, an operating system, one or more application programs, other program modules, and program data, where an implementation of a network environment may be included in each or some combination of the above examples.

The processor 31 executes various functional applications and data processing, for example, the method for processing CSI of a non-serving cell described above of the present disclosure, by running the computer program stored in the memory 32.

The electronic device 30 may also communicate with one or more external devices 34 (e.g., keyboards, pointing devices, etc.). Such communication may take place through input/output (I/O) interface 35. Also, the model-generating device 30 may also communicate with one or more networks (e.g., a local area network (LAN), a wide area network (WAN), and/or a public network such as the Internet) through a network adapter 36. As shown in FIG. 3, the network adapter 36 communicates with other modules of the model generation device 30 via the bus 33. It should be understood that, although not shown, other hardware and/or software modules may be used in conjunction with the model-generated device 30, including but not limited to: microcode, device drivers, redundant processors, external disk drive arrays, RAID (disk arrays) systems, tape drives, and data backup storage systems.

It should be noted that although several units/modules or sub-units/modules of the electronic device are mentioned in the above detailed description, this division is merely exemplary and not mandatory. Indeed, the features and functions of two or more units/modules described above may be embodied in one unit/module according to embodiments of the present disclosure. Conversely, the features and functions of one unit/module described above may be further subdivided to be embodied by multiple units/modules.

This disclosure provides a computer-readable storage medium on which a computer program is stored, and when the program is executed by a processor, the method for processing CSI of a non-serving cell described above is implemented.

More specifically, the readable storage medium may include, but is not limited to, portable disk, hard disk, random access memory, read-only memory, erasable programmable read-only memory, optical storage device, magnetic storage device, or any suitable combination of the above.

In some possible implementations, the present disclosure can also be implemented in the form of a program product, which includes program codes. When the program product runs on a terminal device, the program codes are configured to make the terminal device execute the method for processing CSI of a non-serving cell described above.

Program codes for carrying out the present disclosure may be written in any combination of one or more programming languages, and the program codes may execute entirely on the UE, partially on the UE, as a stand-alone software package, partly on the UE and partly on the remote device, or entirely on the remote device.

Although the specific embodiments of the present disclosure are described above, those skilled in the art should understand that this is only an illustration, and the protection scope of the present disclosure is defined by the appended claims. Those skilled in the art can make various changes or modifications to these embodiments without departing from the principle and essence of the present disclosure, but these changes and modifications all fall within the protection scope of the present disclosure.

The disclosure is intended to solve the technical problem that the CSI computation delay requirements in related arts cannot meet requirements on CSI measurement and reporting for non-serving cells, and aims to provide a method and system for processing channel state information (CSI) for a non-serving cell, an electronic device, and a medium.

The technical problem are solved by the following solutions in the disclosure.

In this disclosure, a method for processing channel state information (CSI) for a non-serving cell is provided. The method is applied to a user equipment and includes: receiving downlink control information (DCI) for triggering an aperiodic CSI report; determining whether the aperiodic CSI report belongs to an aperiodic CSI report for the non-serving cell; and determining that a CSI computation delay requirement for the aperiodic CSI report corresponds to a predefined first CSI computation delay requirement, based on a determination that the aperiodic CSI report belongs to the aperiodic CSI report for the non-serving cell, where the first CSI computation delay requirement is greater than or equal to a second CSI computation delay requirement corresponding to a serving cell.

Preferably, the method further includes obtaining measurement resource configuration information associated with the aperiodic CSI report; determining whether the measurement resource configuration information satisfies a preset condition; and determining that the CSI computation delay requirement for the aperiodic CSI report corresponds to the predefined first CSI computation delay requirement, based on a determination that the measurement resource configuration information satisfies the preset condition.

Preferably, determining whether the aperiodic CSI report belongs to the aperiodic CSI report for the non-serving cell comprises: obtaining, from a network configuration, a measurement signal associated with the aperiodic CSI report; determining whether a physical cell identifier (PCI) of the measurement signal corresponds to the non-serving cell; and determining that the aperiodic CSI report belongs to the aperiodic CSI report for the non-serving cell based on a determination that the PCI of the measurement signal corresponds to the non-serving cell.

Preferably, the preset condition comprises at least one of: including measurement gap configuration information, including frequency point configuration information different from frequency point configuration information for the serving cell, or including sub-carrier-space configuration information different from the serving cell.

Preferably, the method further includes determining that the CSI computation delay requirement for the aperiodic CSI report corresponds to the second CSI computation delay requirement, based on a determination that the measurement resource configuration information does not satisfy the preset condition.

In this disclosure, a system for processing channel state information (CSI) for a non-serving cell is further provided. The system includes an information receiving module, a first judging module, and a determining module configured in a user equipment (UE). The information receiving module is configured to receive downlink control information (DCI) for triggering an aperiodic CSI report. The first judging module is configured to determine whether the aperiodic CSI report belongs to an aperiodic CSI report for the non-serving cell, and determine that a CSI computation delay requirement for the aperiodic CSI report corresponds to a predefined first CSI computation delay requirement, based on a determination that the aperiodic CSI report belongs to the aperiodic CSI report for the non-serving cell, where the first CSI computation delay requirement is greater than or equal to a second CSI computation delay requirement corresponding to a serving cell.

Preferably, the system further includes a resource-configuration obtaining module and a second judging module configured in the UE. The resource-configuration obtaining module is configured to obtain measurement resource configuration information associated with the aperiodic CSI report. The second judging module is configured to determine whether the measurement resource configuration information satisfies a preset condition, and invoke the first judging module to determine that the CSI computation delay requirement for the aperiodic CSI report corresponds to the predefined first CSI computation delay requirement, based on a determination that the measurement resource configuration information satisfies the preset condition.

Preferably, the system further includes a measurement-signal obtaining module configured in the UE. The measurement-signal obtaining module is configured to obtain, from a network configuration, a measurement signal associated with the aperiodic CSI report. The first judging module is configured to determine whether a physical cell identifier (PCI) of the measurement signal corresponds to the non-serving cell, and determine that the aperiodic CSI report belongs to the aperiodic CSI report for the non-serving cell, based on a determination that the PCI of the measurement signal corresponds to the non-serving cell.

Preferably, the preset condition comprises at least one of: including measurement gap configuration information, including frequency point configuration information different from frequency point configuration information for the serving cell, or including sub-carrier-space configuration information different from the serving cell.

Preferably, the determining unit is configured to determine that the CSI computation delay requirement for the aperiodic CSI report corresponds to the second CSI computation delay requirement, based on a determination that the measurement resource configuration information does not satisfy the preset condition.

In this disclosure, an electronic device is further provided. The electronic device includes a memory, a processor, and a computer program stored in the memory and executable on the processor to carry out the above method for processing CSI for the non-serving cell.

In this disclosure, a computer-readable storage medium storing a computer program is provided. The computer program is executable on a processor to carry out the above method for processing CSI for the non-serving cell.

The disclosure has the following advantages.

In this disclosure, the CSI computation delay requirement corresponding to the non-serving cell is predefined, and an aperiodic CSI report is triggered according to the CSI request field. If the aperiodic CSI report is for the non-serving cell and the associated measurement resource configuration information satisfies the preset condition, the CSI computation delay requirement is determined to follow the predefined CSI computation delay requirement, so that the CSI computation delay requirement for the non-serving cell can be satisfied, and subsequent CSI measurement and reporting requirements for the non-serving cell can be satisfied.

What is claimed is:

1. A method for processing channel state information (CSI) for a non-serving cell, applied to a user equipment and comprising:
   receiving downlink control information (DCI) for triggering an aperiodic CSI report;
   determining whether the aperiodic CSI report is an aperiodic CSI report for the non-serving cell; and
   determining that a CSI computation delay requirement for the aperiodic CSI report corresponds to a predefined first CSI computation delay requirement, based on a determination that the aperiodic CSI report is the aperiodic CSI report for the non-serving cell, the first CSI computation delay requirement being greater than or equal to a second CSI computation delay requirement corresponding to a serving cell;
   wherein determining whether the aperiodic CSI report is the aperiodic CSI report for the non-serving cell comprises:
      obtaining, from a network configuration, a measurement signal associated with the aperiodic CSI report;
      determining whether a physical cell identifier (PCI) of the measurement signal corresponds to the non-serving cell; and determining that the aperiodic CSI report is the aperiodic CSI report for the non-serving cell based on a determination that the PCI of the measurement signal corresponds to the non-serving cell.

2. The method of claim 1, further comprising:
obtaining measurement resource configuration information associated with the aperiodic CSI report;
determining whether the measurement resource configuration information satisfies a preset condition; and
determining that the CSI computation delay requirement for the aperiodic CSI report corresponds to the predefined first CSI computation delay requirement, based on a determination that the measurement resource configuration information satisfies the preset condition.

3. The method of claim 2, wherein the preset condition comprises at least one of:
the measurement resource configuration information including measurement gap configuration information,
the measurement resource configuration information including frequency point configuration information different from frequency point configuration information for the serving cell, or
the measurement resource configuration information including sub-carrier-space configuration information different from sub-carrier-space configuration information for the serving cell.

4. The method of claim 2, further comprising:
determining that the CSI computation delay requirement for the aperiodic CSI report corresponds to the second CSI computation delay requirement, based on a determination that the measurement resource configuration information does not satisfy the preset condition.

5. The method of claim 1, wherein the measurement signal is information from the measurement resource configuration information.

6. The method of claim 1, wherein the measurement signal is a non-zero power CSI reference signal (NZP CSI-RS), a synchronization signal and PBCH block (SSB), or a CSI-inference measurement (CSI-IM) used for measurement.

7. An electronic device, comprising:
a processor; and
a memory storing a computer program executable on the processor to cause the processor to:
receive downlink control information (DCI) for triggering an aperiodic CSI report;
determine whether the aperiodic CSI report is an aperiodic CSI report for the non-serving cell; and
determine that a CSI computation delay requirement for the aperiodic CSI report corresponds to a predefined first CSI computation delay requirement, based on a determination that the aperiodic CSI report is the aperiodic CSI report for the non-serving cell, the first CSI computation delay requirement being greater than or equal to a second CSI computation delay requirement corresponding to a serving cell;
wherein the processor configured to determine whether the aperiodic CSI report is the aperiodic CSI report for the non-serving cell is configured to:
obtain, from a network configuration, a measurement signal associated with the aperiodic CSI report;
determine whether a physical cell identifier (PCI) of the measurement signal corresponds to the non-serving cell; and
determine that the aperiodic CSI report is the aperiodic CSI report for the non-serving cell based on a determination that the PCI of the measurement signal corresponds to the non-serving cell.

8. The electronic device of claim 7, wherein the computer program is executable on the processor to further cause the processor to:
obtain measurement resource configuration information associated with the aperiodic CSI report;
determine whether the measurement resource configuration information satisfies a preset condition; and
determine that the CSI computation delay requirement for the aperiodic CSI report corresponds to the predefined first CSI computation delay requirement, based on a determination that the measurement resource configuration information satisfies the preset condition.

9. The electronic device of claim 8, wherein the preset condition comprises at least one of:
the measurement resource configuration information including measurement gap configuration information,
the measurement resource configuration information including frequency point configuration information different from frequency point configuration information for the serving cell, or
the measurement resource configuration information including sub-carrier-space configuration information different from sub-carrier-space configuration information for the serving cell.

10. The electronic device of claim 8, wherein the computer program is executable on the processor to further cause the processor to:
determine that the CSI computation delay requirement for the aperiodic CSI report corresponds to the second CSI computation delay requirement, based on a determination that the measurement resource configuration information does not satisfy the preset condition.

11. The electronic device of claim 7, wherein the measurement signal is information from measurement resource configuration information.

12. The electronic device of claim 7, wherein the measurement signal is a non-zero power CSI reference signal (NZP CSI-RS), a synchronization signal and PBCH block (SSB), or a CSI-inference measurement (CSI-IM) used for measurement.

13. A non-transitory computer-readable storage medium storing a computer program, the computer program being executable on a processor to cause the processor to:
receive downlink control information (DCI) for triggering an aperiodic CSI report;
determine whether the aperiodic CSI report is an aperiodic CSI report for the non-serving cell; and
determine that a CSI computation delay requirement for the aperiodic CSI report corresponds to a predefined first CSI computation delay requirement, based on a determination that the aperiodic CSI report is the aperiodic CSI report for the non-serving cell, the first CSI computation delay requirement being greater than or equal to a second CSI computation delay requirement corresponding to a serving cell;
wherein the processor configured to determine whether the aperiodic CSI report is the aperiodic CSI report for the non-serving cell is configured to:
obtain, from a network configuration, a measurement signal associated with the aperiodic CSI report;
determine whether a physical cell identifier (PCI) of the measurement signal corresponds to the non-serving cell; and
determine that the aperiodic CSI report is the aperiodic CSI report for the non-serving cell based on a determination that the PCI of the measurement signal corresponds to the non-serving cell.

14. The non-transitory computer-readable storage medium of claim 7, wherein the computer program is executable on the processor to further cause the processor to:
   obtain measurement resource configuration information associated with the aperiodic CSI report;
   determine whether the measurement resource configuration information satisfies a preset condition; and
   determine that the CSI computation delay requirement for the aperiodic CSI report corresponds to the predefined first CSI computation delay requirement, based on a determination that the measurement resource configuration information satisfies the preset condition.

15. The non-transitory computer-readable storage medium of claim 14, wherein the preset condition comprises at least one of:
   the measurement resource configuration information including measurement gap configuration information,
   the measurement resource configuration information including frequency point configuration information different from frequency point configuration information for the serving cell, or
   the measurement resource configuration information including sub-carrier-space configuration information different from sub-carrier-space configuration information for the serving cell.

16. The non-transitory computer-readable storage medium of claim 14, wherein the computer program is executable on the processor to further cause the processor to:
   determine that the CSI computation delay requirement for the aperiodic CSI report corresponds to the second CSI computation delay requirement, based on a determination that the measurement resource configuration information does not satisfy the preset condition.

17. The non-transitory computer-readable storage medium of claim 13, wherein the measurement signal is information from measurement resource configuration information.

* * * * *